(12) United States Patent
Klose et al.

(10) Patent No.: US 9,845,247 B2
(45) Date of Patent: Dec. 19, 2017

(54) PROCESS FOR PRODUCING POLYCRYSTALLINE SILICON

(71) Applicant: Wacker Chemie AG, Munich (DE)

(72) Inventors: Goeran Klose, Hirten (DE); Heinz Kraus, Zeilarn (DE); Franz Salzeder, Unterdietfurt (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 14/907,932

(22) PCT Filed: Jul. 10, 2014

(86) PCT No.: PCT/EP2014/064851
§ 371 (c)(1),
(2) Date: Jan. 27, 2016

(87) PCT Pub. No.: WO2015/014590
PCT Pub. Date: Feb. 5, 2015

(65) Prior Publication Data
US 2016/0167971 A1    Jun. 16, 2016

(30) Foreign Application Priority Data
Jul. 29, 2013   (DE) .................. 10 2013 214 799

(51) Int. Cl.
*C01B 33/035*    (2006.01)
(52) U.S. Cl.
CPC ................ *C01B 33/035* (2013.01)

(58) Field of Classification Search
CPC ................................. C01B 33/035
See application file for complete search history.

(56) References Cited

U.S. PATENT DOCUMENTS

| | | |
|---|---|---|
| 5,904,981 A | 5/1999 | Oda |
| 2008/0286550 A1 | 11/2008 | Sofin et al. |
| 2010/0219380 A1 | 9/2010 | Hertlein et al. |
| 2012/0048178 A1 | 3/2012 | Schaefer et al. |
| 2016/0003736 A1* | 1/2016 | Gigler .................... G01N 21/15 |
| | | 356/338 |

FOREIGN PATENT DOCUMENTS

| | | |
|---|---|---|
| CN | 101311657 A | 11/2008 |
| CN | 201302372 Y | 9/2009 |
| CN | 102311120 A | 1/2012 |
| CN | 102311120 B | 4/2013 |
| DE | 1300516 B | 8/1969 |
| DE | 10 2007 023 041 A1 | 11/2008 |
| DE | 10 2007 047 210 A1 | 4/2009 |
| EP | 2077252 A2 | 7/2009 |
| GB | 805812 | 12/1958 |
| JP | 61192339 A | 8/1986 |
| JP | 1994042958 U | 6/1994 |
| JP | 2004277223 A1 | 10/2004 |
| JP | 2010254561 A * | 11/2010 |
| WO | 9707051 A2 | 2/1997 |

* cited by examiner

*Primary Examiner* — Anthony J Zimmer
(74) *Attorney, Agent, or Firm* — Brooks Kushman P.C.

(57) ABSTRACT

Deposition on a sightglass in a reactor for CVD deposition of silicon is reduced by conducting a first purge gas stream substantially parallel to the reactor end surface of the sightglass, and conducting a second purge gas stream within the sightglass tube at an angle from the sightglass surface toward the interior of the reactor.

11 Claims, 3 Drawing Sheets

PROCESS FOR PRODUCING POLYCRYSTALLINE SILICON

CROSS REFERENCE TO RELATED APPLICATIONS

This application is the U.S. National Phase of PCT Appln. No. PCT/EP2014/064851 filed Jul. 10, 2014, which claims priority to German Application No. 10 2013 214 799.6 filed Jul. 29, 2013, the disclosures of which are incorporated in their entirety by reference herein.

BACKGROUND OF THE INVENTION

1. Field of the Invention

The invention provides a process for producing polycrystalline silicon.

2. Description of the Related Art

Polycrystalline silicon (polysilicon for short) serves as a starting material in the production of monocrystalline silicon by means of crucible pulling (Czochralski or CZ process) or by means of zone melting (float zone or FZ process). This monocrystalline silicon is divided into wafers and, after a multitude of mechanical, chemical and chemo-mechanical processing operations, used in the semiconductor industry for manufacture of electronic components (chips).

More particularly, however, polycrystalline silicon is required to an increased degree for production of mono- or multicrystalline silicon by means of pulling or casting processes, this mono- or multicrystalline silicon serving for manufacture of solar cells for photovoltaics.

The polycrystalline silicon is typically produced by means of the Siemens process. In this process, in a bell jar-shaped reactor ("Siemens reactor"), thin filament rods ("thin rods") of silicon are heated by direct passage of current and a reaction gas containing a silicon-containing component and hydrogen is introduced.

The silicon-containing component of the reaction gas is generally monosilane or a halosilane of the general composition $SiH_nX_{4-n}$ (n=0, 1, 2, 3; X=Cl, Br, I). It is preferably a chlorosilane or chlorosilane mixture, more preferably trichlorosilane. Predominantly $SiH_4$ or $SiHCl_3$ (trichlorosilane, TCS) is used in a mixture with hydrogen.

EP 2 077 252 A2 describes the typical setup of a reactor type used in the production of polysilicon.

The reactor base is provided with electrodes that accommodate the thin rods on which silicon is deposited during the growth process, and which thus grow to form the desired rods of polysilicon. Typically, two thin rods in each case are joined by a bridge to form a pair of thin rods, which form a circuit through the electrodes and through external devices, which serves to heat the rod pairs to a particular temperature.

Moreover, the reactor base is additionally provided with nozzles that supply the reactor with fresh gas. The offgas is conducted back out of the reaction space via orifices.

The amount of reaction gases supplied is typically varied as a function of the rod diameter, i.e. is generally increased with increasing rod diameter.

High-purity polysilicon is deposited on the heated rods and the bridge, as a result of which the rod diameter grows with time (CVD=chemical vapor deposition/gas phase deposition).

DE 102 007 047 210 A1 discloses a process that leads to polysilicon rods having advantageous flexural strength. Moreover, the specific energy consumption in this process is particularly low. With regard to process parameters, a maximum value of the flow rate of the chlorosilanes mixture is attained within fewer than 30 hours, preferably within fewer than 5 hours, with the temperature on the underside of the bridge between 1300° C. and 1413° C.

DE 10 2007 023 041 A1 describes a further process for producing polysilicon, specifically for FZ (float zone) silicon. It envisages a rod temperature of 950 to 1090° C. and a particular proportion of chlorosilanes in the reaction gas up to a rod diameter of 30 mm, and a switch in the rod temperature to 930 to 1030° C. and an increase in the proportion of chlorosilanes in the reaction gas no later than attainment of a rod diameter of 120 mm. Abrupt changes in the growth conditions must not be made over the entire deposition period.

US 20120048178 A1 discloses a process for producing polycrystalline silicon, comprising introduction of a reaction gas comprising a silicon-containing component and hydrogen by means of one or more nozzles into a reactor comprising at least one heated filament rod on which silicon is deposited, wherein an Archimedes number $Ar_n$, which describes flow conditions in the reactor as a function of the fill level FL which states the ratio of a rod volume to an empty reactor volume in percent, for a fill level FL of up to 5%, is within a range limited at a lower end by a function $Ar=2000 \times FL^{-0.6}$ and at an upper end by a function $Ar=17000 \times FL^{-0.9}$, and at a fill level of greater than 5% is within a range from at least 750 to at most 4000.

The fill level of a reactor states the ratio of the volume of the rods to the empty volume of the reactor in percent. The empty volume of the reactor is constant. The fill level thus increases with increasing process duration since the volume of the rods increases.

The Archimedes number is given by $$Ar=\pi * g * L^3 * A_d * (T_{rod}-T_{wall})/(2*Q^2*(T_{rod}+T_{wall}))$$

where g is the acceleration due to gravity in m/s², L is the rod length of the filament rods in m, Q is the volume flow of the gas in m³/s under operating conditions (p, T), $A_d$ is the sum total of all the nozzle cross-sectional areas in m², $T_{rod}$ is the rod temperature in K and $T_{wall}$ is the wall temperature in K. The rod temperature is preferably 1150K to 1600K. The wall temperature is preferably 300K to 700K.

It is a relatively common observation in the production of thick polycrystalline silicon rods (having diameter>100 mm) that the rods have regions with a very rough surface ("popcorn"). These rough regions have to be separated from the rest of the material and sold at much lower prices than the rest of the silicon rod.

U.S. Pat. No. 5,904,981 A discloses that a temporary reduction in the temperature of the rods can reduce the proportion of the popcorn material. At the same time, it is disclosed that, proceeding from a polycrystalline silicon rod having a diameter of 5 mm as a filament (thin rod), a surface temperature of the rod is kept at 1030° C. and polycrystalline silicon is deposited, and, when the rod diameter reaches 85 mm, the electrical current is kept constant, as a result of which the temperature falls, and, as soon as a temperature of 970° C. is attained, the temperature of the rods is increased gradually back up to 1030° C. over a period of 30 hours, stopping the deposition when the rod diameter reaches 120 mm. The proportion of popcorn in this case is 13%. The effect of such changes, however, is that the process runs less quickly and hence the output is reduced, which reduces the economic viability.

In the known processes for deposition of polycrystalline silicon, it is thus necessary to regulate the rod temperature. The temperature at the surface of the rods is the crucial parameter in the process for producing polycrystalline silicon, since the polycrystalline silicon is deposited at the rod surface. For this purpose, the rod temperature has to be measured. The rod temperature is typically measured with radiation pyrometers on the surfaces of the vertical rods.

Because of its material properties, contactless temperature measurement on silicon is very demanding. This is because the emission level of the material varies significantly over the infrared spectrum and is additionally dependent on the material temperature. In order nevertheless to achieve exact and repeatable measurement results, the manufacturers provide the instruments with filters to about 0.9 µm, and so evaluate only a small portion of the radiation spectrum, restricted to a particular wavelength range by a filter, since the emission level of silicon within this wavelength range is both relatively high and independent of temperature.

Because of hydrogen in the atmosphere, specific explosion-proof housings are typically used for the pyrometers.

The pyrometer gains optical access through a sightglass or a window. The lens or the window for instruments in the near infrared range consists of glass or quartz glass.

The pyrometers are mounted at the sightglasses outside the reactor and are directed at the polysilicon rod to be measured. The sightglass seals the reactor off from the environment by means of a transparent glass surface and seals.

It has now been found that, in the course of the deposition process, a layer of deposits forms on the sightglass, which may be of different thickness according to the mode of operation. This particularly affects the (inner) glass surface at the reactor end. This layer of deposits causes an attenuation of the measured radiation intensity. As a result, the pyrometer measures temperatures that are too low. The result of this is that the rod temperatures are set too high by the electrical power regulation system of the reactor, which causes unwanted process properties such as dust deposition, impermissibly high popcorn growth, local melting of the silicon rods, etc. In the worst case—namely in the case of excessively thick deposits—the process has to be ended prematurely.

Economic disadvantages as a result of off-spec and hence reduced-value products or increased production costs as a result of prematurely shut-down or failed batches are the consequences of deposits on the sightglass.

In the prior art, efforts have been made to minimize formation of deposits on the glass surfaces, by blowing an inert gas or hydrogen over the glass surface, in order to flush silanes or chlorosilanes, which have a tendency to form deposits on the glass, away from the glass surface, or keep them away from the glass surface.

JP2010254561 A2 describes a sightglass where hydrogen is used as purge gas and is injected into the tube. The ratio of tube length to tube diameter (L/D) in this arrangement is between 5 and 10. A disadvantage is the greatly restricted viewing range resulting from the long, thin sightglass tube.

CN 201302372Y likewise discloses a sightglass where particles adhering on the sightglass lens are to be removed by blowing in gas medium (hydrogen) involved in the reaction, which cleans the lens. The inner connecting tube is connected at one end to a gas medium cleaning apparatus, such that the inside surface of the sightglass lens can be cleaned in the course of operation. Between the first sightglass lens and the second sightglass lens is a cooling water duct, by means of which the first sightglass lens and the second sightglass lens can be cooled and cleaned.

CN102311120 B discloses a sightglass where hydrogen as purge gas is injected through a multitude of holes at an oblique angle to the sightglass surface. The holes are distributed over the entire circumference of the sightglass tube and aligned radially with respect to the axis of the sightglass tube.

However, it has been found that this prevents the formation of deposits only in some regions of the sightglass, but actually enhances it in other regions. Moreover, it has been observed at times that the positions of deposit-free regions on the sightglass surface changes during the process. Thus, reproducible temperature measurements are impossible.

This problem gave rise to the objective of the invention. The sightglass is to remain free of deposits and impurities over the entire batch run.

SUMMARY OF THE INVENTION

These and other objects are achieved by a process for producing polycrystalline silicon, comprising introducing a reaction gas comprising a silicon-containing component and hydrogen into a reactor containing at least one heated filament rod on which polycrystalline silicon is deposited, the reactor comprising at least one tubular sightglass secured to an orifice in the reactor wall by a reactor end and having a glass surface at the other end, with supply of a purge gas through holes in the sightglass tube during the deposition, wherein one purge gas stream runs close to the glass surface of the sightglass and essentially parallel to the glass surface and, spaced apart from this purge gas stream in the direction of the reactor end of the sightglass, at least one further purge gas stream runs at an angle relative to the glass surface in the direction of the reactor end of the sightglass.

DETAILED DESCRIPTION OF THE PREFERRED EMBODIMENTS

Figure 1:
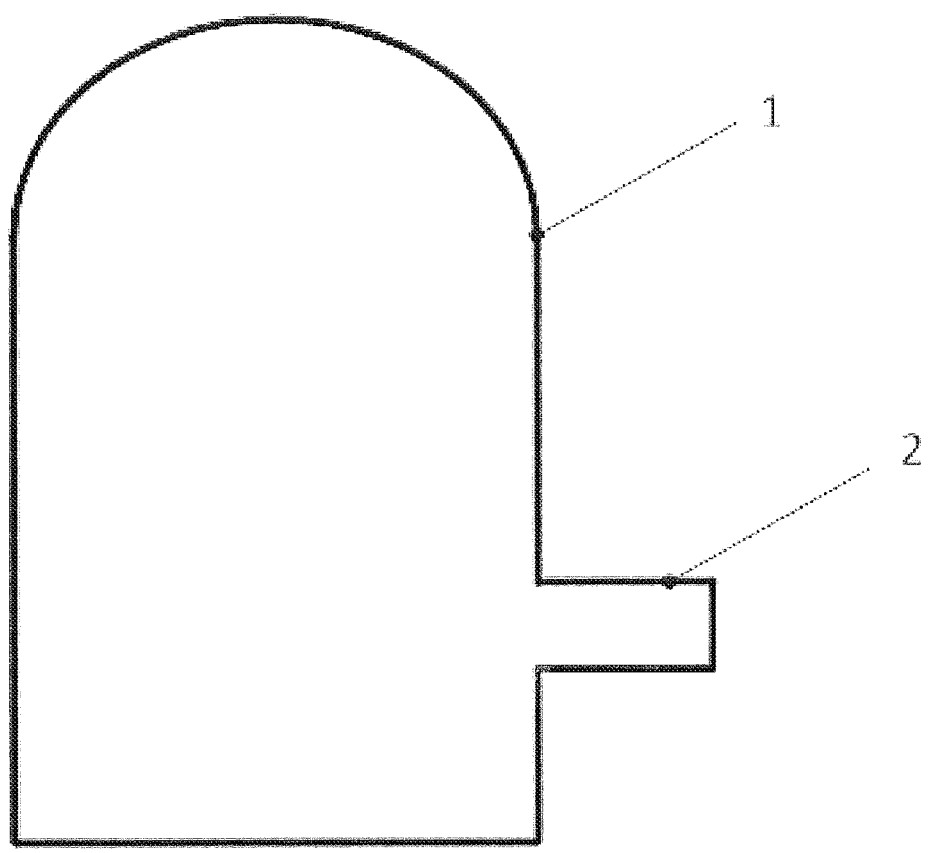
FIG. 1 shows, in highly schematic form, a deposition reactor with sightglass.

The inventors have recognized that, in the solutions proposed in the prior art, it was not possible to reliably prevent contact of the silicon-containing reaction gas with the glass surface of the sightglass because an injector effect was associated with the purge gas jets directed toward the glass surface of the sightglass, and this conveyed silicon-containing reaction gas to the glass surface and led to unwanted formation of deposits at least in some regions.

Therefore, a sightglass having a novel purge gas supply has been developed, which suppresses contact of the glass surfaces on the reactor side with the reaction gas (chlorosilanes) and hence prevents formation of deposits.

In contrast to the prior art, the purge gas is injected here into the sightglass tube at several positions.

A purge gas stream is introduced close to the glass surface of the tube. This runs essentially parallel to the glass surface.

For this purpose, offset rows of holes aligned parallel to the glass surface are preferably provided in the immediate proximity of the glass surface. This effectively produces a "curtain" of purge gas that can keep the reaction gas away from the glass surface.

Without further measures, however, this can only be achieved when the purge gas rate supplied is suitably selected.

In order to be independent of the purge gas rate supplied, in accordance with the invention, at least one second purge gas stream is provided, spaced apart from the first purge gas stream in the direction of the reactor end of the tube.

This second purge gas stream does not, or the further purge gas streams do not, run parallel to the glass surface of the sightglass, but at an oblique angle, namely inclined with respect to the plane of the glass surface of the sightglass, specifically in the direction of the reactor end of the sightglass. The reactor end means that end of the tube mounted at an orifice in the reactor wall.

In order to introduce the second purge gas stream into the tube of the sightglass, holes aligned preferably at an oblique angle to the middle of the reactor are present in the tube.

The introduction of the further purge gas stream gives rise to a flow regime independent of the purge gas rate supplied in the sightglass tube.

This enables process-matched regulation of the purge gas rate required for sightglass purging, without worsening the quality of the sightglass purging.

Suitable purge gas is the following gases or any desired combinations as a gas mixture: noble gases (e.g. Ar, He), nitrogen, chlorosilanes of the $SiH_nCl_{n-4}$ form, n=0-4, in conjunction with a chlorosilane-free gas (e.g. $SiCl_4$ with hydrogen), hydrogen, HCl gas.

Particular preference is given to using hydrogen.

LIST OF REFERENCE NUMERALS USED 1 deposition reactor
2 sightglass
3 glass pane
4 hole(s) for purge mass flow M1
5 hole(s) for purge mass flow M2

FIG. 1 shows a deposition reactor 1 and a sightglass 2 secured to the reactor wall.

Figure 2:
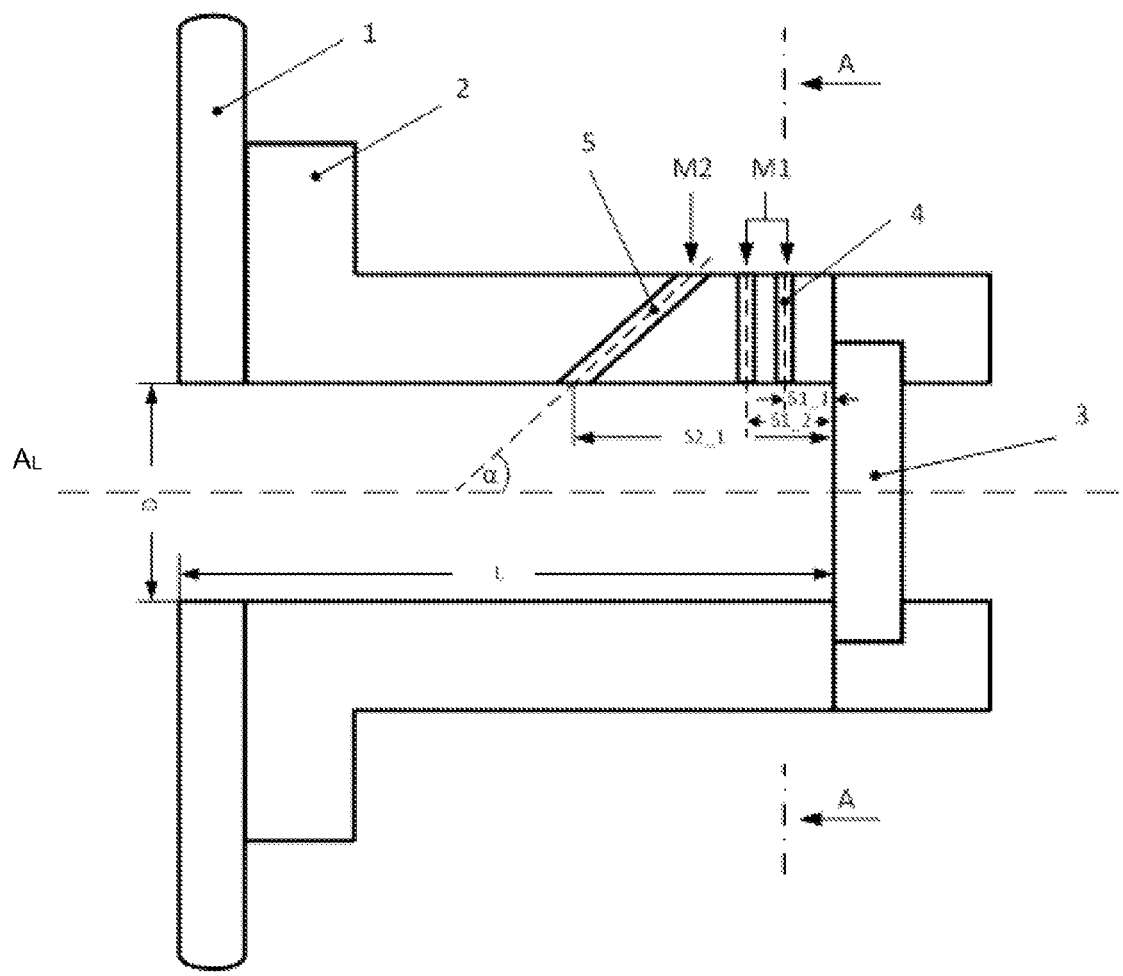
FIG. 2 shows one embodiment of the invention in longitudinal section.

FIG. 2 shows a deposition reactor 1 and a sightglass 2 secured to the reactor wall and having a glass pane 3. The sightglass 2 comprises two rows of holes 4 for purge mass flow M1 and one row of holes 5 for purge mass flow M2.

Figure 3:
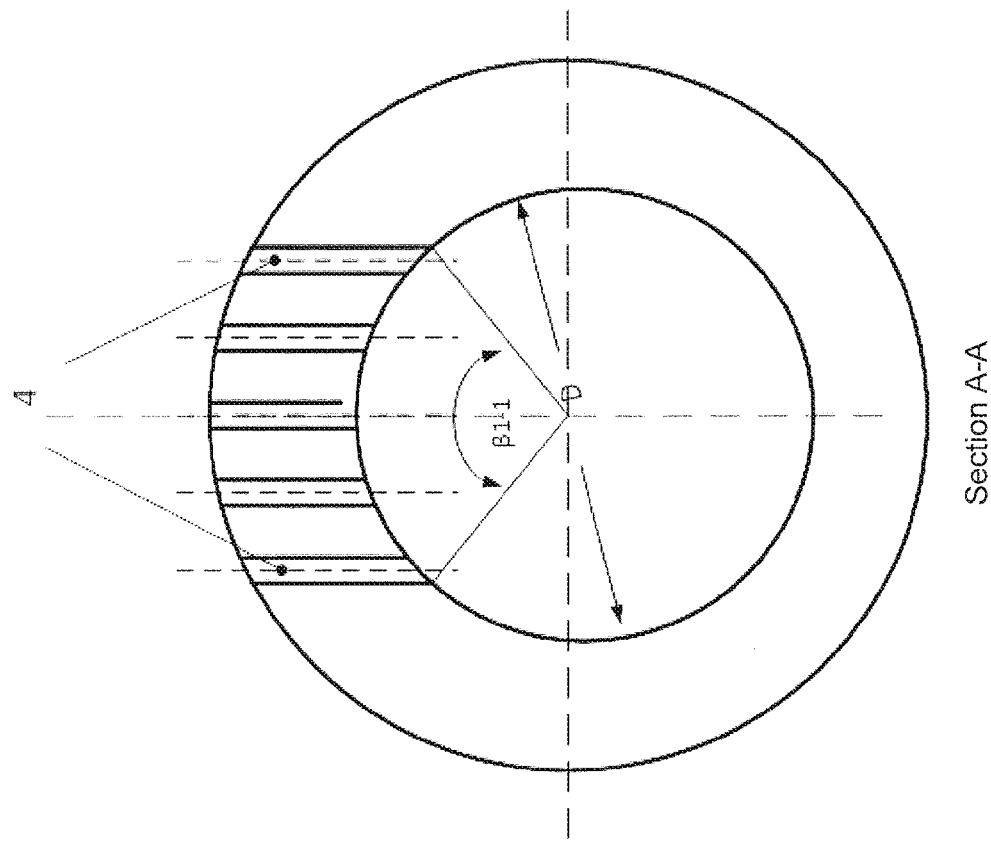
FIG. 3 shows one embodiment of the invention in cross section through the tube.

FIG. 3 shows section A-A through a row of holes 4 of FIG. 2. It becomes apparent that several holes parallel to one another are present.

The invention enables the use of sightglasses having comparatively small tube/construction lengths. Thus, preference is given to a ratio L/D of tube length L to tube diameter D of 0.5-4.0. More preferably, the ratio L/D=0.7-3.0, most preferably 1.0-2.0.

Preference is given to injecting a first portion M1 of the purge gas through one or more mutually offset rows of holes.

These rows of holes are arranged on one side of the tube, preferably the upper side, within an angle range $\beta1\_n$ (n=index for row of holes) of 40°-180°, preferably 50°-130°, more preferably 60°-120°, about the vertical. Rotation of the angle range $\beta1\_n$ including the holes by 0-180° about the tube axis (deviation from the vertical) is possible.

The distance of the holes within a row from the respective neighboring hole may be different or equal within a row, and is preferably equal.

Holes are preferably positioned such that their exit orifices in the sightglass tube are within the angle range $\beta1\_n$. The rows of holes are preferably aligned parallel to one another and to the glass surface. All the holes are preferably likewise aligned parallel to one another and to the opposite tube wall. In this way, a broad purge gas curtain is placed in front of the glass surface.

According to the invention, the purge gas is divided into two substreams (M1 and M2). M1 corresponds to the gas stream running parallel to the glass surface, M2 to the gas stream that runs at an oblique angle; see also FIG. 2. The ratio of the purge mass flow rates is preferably set as follows: ⅓<M1/M2<20. More preferably, 1<M1/M2<15; most preferably, 2<M1/M2<10.

The cross-sectional area of the tube ($A_T$) based on the total area ($A_{M1}$) of all the holes in the first portion of the purge gas (M1) is preferably within the range of 8<$A_T$/$A_{M1}$<300, more preferably 12<$A_T$/$A_{M1}$<150 and most preferably 15<$A_T$/$A_{M1}$<80.

The number (N) of rows of holes through which the first portion of the purge gas is introduced is 1<=N<=5, preferably 1<=N<=3.

The ratio between the tube diameter (D) and the axial separations $S1\_n$ of the rows of holes from the sightglass surface is preferably within the range of 1<D/$S1\_n$<40, more preferably 1.5<D/$S1\_n$<20 and most preferably 1.5<D/$S1\_n$<10.

If separations of holes or rows of holes are specified, these are each specified proceeding from the geometric axis of the holes.

For injection of the second portion of the purge gas (M2) at an oblique angle to the tube axis, preference is given to using rows of holes which are likewise preferably arranged on the upper side of the tube within an angle range $\beta2\_n$ (n=index for row of holes) of 40°-180°, more preferably 50°-130°, most preferably 60°-120°, about the vertical. Rotation of the angle range $\beta2\_n$ including the holes by 0-180° about the tube axis (deviation from the vertical) is possible.

The distance of the holes within a row from the respective neighboring hole may be different or equal within a row, and is preferably equal.

The holes are preferably positioned such that the exit orifices thereof in the sightglass tube are within the angle range $\beta2\_n$.

All the holes for the second portion of the purge gas (M2) are preferably aligned parallel to one another and within an angle range α of 10°-80°, more preferably 20°-70°, most preferably 30°-60°, to the tube axis, in the direction of the reactor end of the tube.

The cross-sectional area of the tube ($A_T$) based on the total area ($A_{M2}$) of all the holes aligned at an oblique angle to the tube axis is preferably 5<$A_T$/$A_{M2}$<500, more preferably 20<$A_T$/$A_{M2}$<300 and most preferably 40<$A_T$/$A_{M2}$<150.

The number (K) of rows of holes for the second portion of the purge hydrogen is 1<=K<=5, preferably 1<=K<=3.

The ratio between the tube diameter (D) and the axial separation ($S2\_k$) of the hole exits (at oblique angles to the tube axis) or rows of holes from the sightglass surface is preferably in the range of 0.4<D/$S2\_k$<40, more preferably 0.6<D/$S2\_k$<20 and most preferably (0.8<D/$S2\_k$<10). Since the holes run at oblique angles, the distances relative to the geometric axis of the holes at the holes drilled on the inner surface of the tube are specified, cf. FIG. 2.

The process according to the invention with its preferred embodiments virtually completely suppresses contact between reaction gas from the reactor and the internal glass surface of the sightglass at the reactor end. This completely prevents deposits on the glass surface of the sightglass.

The flow field in the sightglass is independent of the purge gas rate. Therefore, if required, very different purge gas rates can be used without deterioration in the quality of the purging through varying flow conditions.

EXAMPLES

In the tests of the different sightglass types, a standard process with a chlorosilane concentration of 20% (mole fraction) in $H_2$ was used.

In this process, marked deposits normally form on the reactor walls.

The target diameter of the silicon rods to be deposited was 150 mm.

Comparative Example

Tube: L/D=2 and D=50 mm

The sightglass had a row of holes at a distance $S1\_1$ of 10 mm from the glass surface.

The holes were arranged parallel to the glass surface in the upper half of the sightglass tube and aligned in the direction of the tube axis.

Every 30°, there was a hole of hole diameter 4 mm (7 holes in total). No further purge gas injections were present.

The sightglass was purged with 30 m³ (STP)/h of $H_2$ through the holes.

During the deposition process, distinctly visible deposits formed on the glass surface at the reactor end in all the batches. These deposits were composed of amorphous compounds consisting of: chlorine, silicon and hydrogen.

The deposits distorted the temperature measurements.

The deposition process had to be ended prematurely for all the batches within the rod diameter range of 110-130 mm because of an excessively high electrical power consumption.

On the basis of the resultant high rod temperatures, increased formation of popcorn was detected.

Example 1

Tube: L/D=2 and D=50 mm.

The sightglass had two mutually offset rows of holes at a distance of $S1\_1$=15 mm and $S1\_2$=25 mm from the glass surface.

The purge gas mass flow was split into two substreams. The first substream M1 was supplied close to the sightglass, parallel to the sightglass surface.

For this purpose, holes were arranged on the top of the sightglass tube within an angle range of $\beta1\_1$=119° about the zero line (vertical). The holes were parallel to the glass surface and aligned vertically downward. The first row consists of 5 holes each with hole diameters of 2 mm. The middle hole was on the vertical. Every two further holes were arranged symmetrically to the vertical at a distance of ±10.3 mm or ±20.5 mm from the vertical. The second row of holes consisted of four holes each having hole diameters of 2 [mm], which were arranged offset from the first row of holes at horizontal separations (every two at ±5.1 mm and ±15.4 mm) symmetrically to the vertical.

The second portion of the purge gas stream was injected obliquely to the tube axis at an angle of $\alpha$=30° (angle relative to the tube axis) in the direction of the reactor through holes parallel to one another. A row of four holes was arranged on the top of the sightglass tube within an angle range of $\beta2\_1$=108° about the zero line (vertical). The holes had a diameter of 2 mm. Every two holes were arranged symmetrically to the vertical at a distance of ±9.6 mm or ±19.2 mm from the vertical. The exit orifices of the holes were at a distance of $S2\_1$=55 mm from the glass surface.

The sightglass was purged with 20 m³ (STP)/h of $H_2$ through the holes. The ratio of the purge mass flows M1/M2 was 3.

Over the course of the deposition process, no visible deposits formed on the glass surface at the reactor end in any of the batches.

The deposition process reached the rod diameter of 150 mm in all the batches. The batches did not have an elevated proportion of popcorn.

Example 2

Tube: L/D=1.3 and D=75 mm

The sightglass had two mutually offset rows of holes at a distance of $S1\_1$=15 mm and $S1\_2$=25 mm from the glass surface.

The purge gas mass flow was split into two substreams. The first substream M1 was supplied close to the sightglass, parallel to the sightglass surface.

For this purpose, holes were arranged on the top of the sightglass tube within an angle range of $\beta1\_1$=119° about the zero line (vertical). The holes were parallel to the glass surface and aligned vertically downward. The first row consists of 7 holes each with hole diameters of 3 mm. The middle hole was on the vertical. Every two further holes were arranged symmetrically to the vertical at a distance of ±10.3 mm, ±20.5 mm or ±30.8 mm from the vertical. The second row of holes consisted of six holes each having hole diameters of 3 [mm], which were arranged offset from the first row of holes. Every 2 holes were arranged at a distance of ±5.1 mm, ±15.4 mm and ±25.6 mm symmetrically to the vertical.

The second portion of the purge gas stream was injected obliquely to the tube axis at an angle of $\alpha$=60° (angle relative to the tube axis) in the direction of the reactor through holes parallel to one another. A row of four holes was arranged on the top of the sightglass tube within an angle range of $\beta2\_1$=65° about the zero line (vertical). The holes had a diameter of 2 mm. Every two holes were arranged symmetrically to the vertical at a distance of ±9.6 mm or ±19.2 mm from the vertical. The exit orifices of the holes were at a distance of $S2\_1$=65 mm from the glass surface.

The sightglass was purged with 30 m³ (STP)/h of $H_2$ through the holes. All the purge gas ducts (M1 and M2) were supplied by a common space that was fed centrally. The ratio of the purge mass flow rates was calculated from the cross-sectional ratio $A_{M1}/A_{M2}$ and was 7.

Over the course of the deposition process, no visible deposits formed on the glass surface at the reactor end in any of the batches.

The deposition process reached the rod diameter of 150-160 mm in all the batches. The morphology of the batches corresponded to the specification.

The invention claimed is:

1. A process for producing polycrystalline silicon, comprising:
   introducing a reaction gas comprising a silicon-containing component and hydrogen into a reactor containing at least one heated filament rod onto which polycrystalline silicon is deposited, wherein the reactor has an interior surrounded by a reactor wall, and at least one sightglass tube having an internal diameter D secured to an orifice in the reactor wall, the sightglass tube having a reactor side end open to the reactor interior, and having an opposing sightglass end containing a sightglass having an inner surface facing the reactor interior and an outer surface facing away from the reactor interior, wherein the sightglass tube has a first plurality of holes arranged in one or more rows in a wall of the sightglass tube proximate the sightglass, the first plurality of holes being holes in the wall of the sightglass tube which run parallel to the inner surface of the sightglass and which are separated from the inner surface of the sightglass by an axial distance $S1\_n$ between the sightglass inner surface and a first row of holes of the first plurality of holes, a further plurality of holes located in the sightglass tube wall between the reactor interior and the first plurality of holes, the further plurality of holes being at an angle to a bore axis of the sightglass tube away from the inner surface of the sightglass and toward the reactor interior, wherein a ratio $D/S1\_n$ between the sightglass tube internal diameter D and the axial distance $S1\_n$ is greater than 1 and less than 40, introducing a first purge gas stream M1 through the first plurality of holes in a direction parallel to the inner surface of the sightglass, and introducing a further purge gas stream M2 through the further plurality of holes in the direction of the reactor interior, the purge gas streams M1 and M2 supplied during the period over which deposits can be deposited on the sightglass.

2. The process of claim 1, wherein the purge gas is selected from the group consisting of noble gases; nitrogen; chlorosilanes of the formula $SiH_nCl_{n-4}$ where n=0-4, in conjunction with a chlorosilane-free gas; hydrogen; HCl, and mixtures of said gases.

3. The process of claim 1, wherein a ratio L/D of sightglass tube length L to sightglass tube diameter D is 0.5-4.0.

4. The process of claim 1, wherein the ratio of purge gas mass flow rates of purge gases M1 and M2 is more than $\frac{1}{3}$ and less than 20.

5. The process of claim 1, wherein purge gas stream M2 is supplied through one or more holes having geometric axes that form an angular range α of 10°-80° with a geometric axis of the sightglass tube.

6. The process of claim 1, wherein the two purge gas streams M1 and M2 are injected via one or more mutually offset rows of holes, each comprising a plurality of holes in the sightglass tube.

7. The process of claim 6, wherein holes in a row of holes are each arranged within an angular range of 40°-180° with respect to an internal cross section of the sightglass.

8. The process of claim 1, wherein the further plurality of holes comprises two or more rows of holes.

9. The process of claim 1, wherein a ratio $D/S2\_k$ between tube diameter D and a maximum axial separation $S2\_k$ of the further plurality of holes is greater than 0.4 and less than 40.

10. The process of claim 1, wherein the sightglass comprises an infrared transmitting glass.

11. The process of claim 1, wherein the sightglass comprises a quartz glass.

* * * * *